United States Patent [19]
Uchida et al.

[11] Patent Number: 6,076,932
[45] Date of Patent: *Jun. 20, 2000

[54] LIGHT ABSORBER AND OPTICAL EQUIPMENT

[75] Inventors: Shinji Uchida; Tsuguhiro Korenaga; Hiroyasu Tsuji, all of Osaka; Shougo Nasu, Hyogo; Norimoto Nouchi, Osaka; Toshio Fukazawa, Kyoto; Toshihiro Kuriyama, Shiga; Yuji Matsuda, Osaka, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/934,867

[22] Filed: Sep. 22, 1997

[30] Foreign Application Priority Data

Sep. 26, 1996 [JP] Japan .................................. 8-254727

[51] Int. Cl.⁷ .................................................... G02B 27/00
[52] U.S. Cl. .......................... 359/614; 359/585; 359/890
[58] Field of Search ................................... 359/601, 614, 359/890, 581, 585, 590, 360

[56] References Cited

U.S. PATENT DOCUMENTS 3,698,928 10/1972 Blome ...................................... 359/614
4,101,200 7/1978 Daxinger ................................. 359/585
4,166,148 8/1979 Sakurai .................................... 428/332
5,179,469 1/1993 Hall et al. ............................... 359/360
5,413,864 5/1995 Miyazaki et al. ....................... 428/432
5,521,759 5/1996 Dobrowolski et al. ................ 359/585
5,691,044 11/1997 Oyama et al. .......................... 428/216

FOREIGN PATENT DOCUMENTS 0 576 144  12/1993  European Pat. Off. .
0 716 334   6/1996  European Pat. Off. .
6-222354    8/1994  Japan .
2 027 925   2/1980  United Kingdom .

OTHER PUBLICATIONS

Communication from European Patent Office and attached Search Report, Jul. 7, 1999.

*Primary Examiner*—Cassandra Spyrou
*Assistant Examiner*—Mark A. Robinson
*Attorney, Agent, or Firm*—Merchant & Gould P.C.

[57] ABSTRACT

This invention provides a light absorber which can be used for optical equipment like optical-disk equipment and a liquid crystal display. The light absorber has a layered structure including a light absorbing layer and a transparent layer. The light absorbing layer absorbs a reflected light from the inside of the absorber as well as incident light into the absorber while the transparent layer helps attenuate the reflected light by interference of light. One of the light absorbing layers which is thicker than others may work as a shading layer for the incident light.

19 Claims, 16 Drawing Sheets

LIGHT ABSORBER AND OPTICAL EQUIPMENT

FIELD OF THE INVENTION

The present invention relates to a light absorber including a substrate and a multiple layer for shading incident light travelling toward the substrate. The light absorber is suitable for application to optical equipment, and the present invention further relates to optical equipment such as an optical-disk equipment, a camera, video-movie camera, a microscope, an endoscope, a dental scope, an optical communication device, a visual display and a laser printer that includes the light absorber.

BACKGROUND OF THE INVENTION

As a film based on a transparent substrate for shading light, Japanese Laid-open Patent Publication No.6-222354 discloses a shading film as shown in FIG. 16. The shading film on a substrate 163 includes a chromium oxide film 162 which is substantially transparent in a visible region and a chromium film 161 which is substantially opaque in a visible region. The chromium oxide film 162 has a thickness between 50 nm and 75 nm to make reflected light from the layers (the chromium oxide film 162 and the chromium film 161) interfere so that the shading film shows both low transmittance and low reflectance.

While the shading film as described above succeeds in lowering light reflectrance to some extent, the light reflectance is reported to still remain at about 6.5% in Japanese Laid-open Patent Publication No.6-222354. Such a level of a light reflectance is not sufficient for applying a shading film to an optical device for an optical equipment such as a light pickup device for an optical-disk equipment, a dividing-color prism for a video-movie camera, an imaging sensor and various kinds of lens.

SUMMARY OF THE INVENTION

There has been a need for a light absorber that shows a lower light reflectance than previously. An object of the present invention is to provide such a light absorber that can improve the performance of an optical device and to provide optical equipment in which such a light absorber is utilized effectively.

In accordance with one aspect of the present invention, there is provided a light absorber comprising a substrate and a multilayer film formed on the substrate, wherein the multilayer film comprises a shading layer for shading incident light, a light absorbing layer formed between an incident side of the incident light and the shading layer, and a transparent layer formed between the shading layer and the light absorbing layer. The light absorber attenuates reflected incident light from the shading layer by absorption into the light absorbing layer.

DESCRIPTION OF THE PREFERRED EMBODIMENTS

Figure 1:
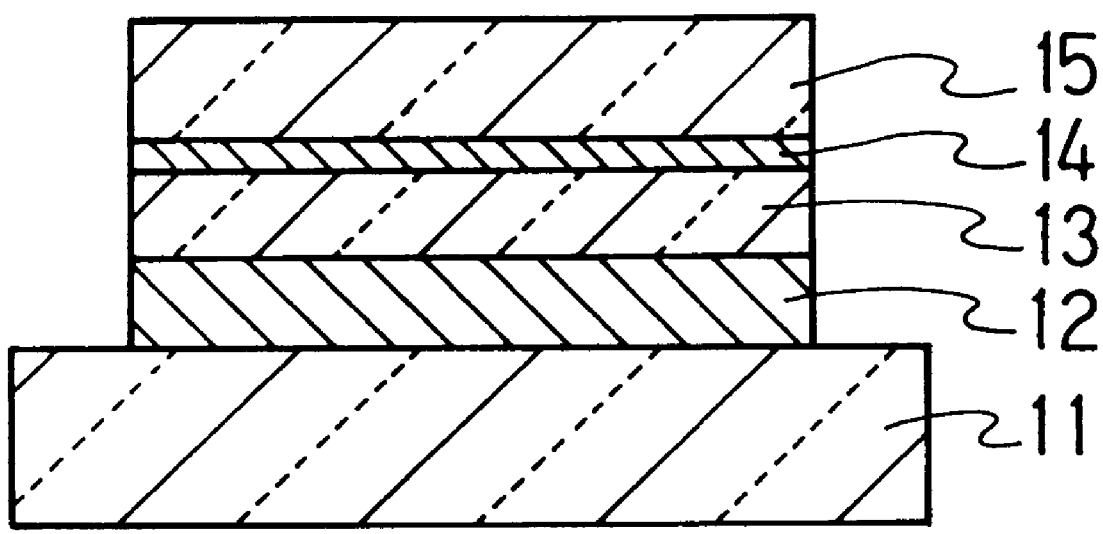
FIG. 1 is a cross sectional view showing a light absorber in accordance with the present invention.

It is preferable in the light absorber that the light absorbing layer is composed of a material in which the product of a refractive index multiplied by an absorption coefficient is at least two, because reflection from the light absorbing layer can be better controlled and the reflected light from the shading layer is absorbed into the light absorbing layer more effectively.

When a ray of light enters into an light absorbing medium in which a refractive index is represented by $n_1$ and an absorption coefficient is represented by $k_1$ from a medium in which a refractive index is represented by $n_0$, the reflection R of the light from the light absorbing medium is generally represented as follows:

$$R=((n_0-n_1)\times(n_0-n_1)+k_1\times k_1)/((n_0+n_1)\times(n_0+n_1)+k_1\times k_1)$$

The above formula teaches that a lower $k_1$ is more desirable to lower the reflection R. However, making $k_1$ much lower for the light absorbing layer in the light absorber of the present invention should be avoided in consideration of the absorption of the reflected light from the shading layer. The refractive index $n_1$ is also preferably not too high and not too low. The preferred range of $n_1$ and $k_1$ was investigated experimentally and it was found that $n_1 \times k_1 \geq 2$ ("n·k value" is at least two) is preferable in the light absorbing layer.

For example, when the light absorbing layer of the present invention was composed of Ag (n·k value is 0.4; n=0.12, k=3.45), the reflection from the Ag layer was too high to lower the reflectance of the light absorber sufficiently in spite of better absorption by the layer. The refractive index is believed to be too low. When the light absorbing layer was composed of crystal-Si (n·k value is 0.12; n=4.04, k=0.03), the absorption of the reflected light from the shading layer was too small to lower the reflectance light of the light absorber sufficiently in spite of the lower reflection from the crystal-Si layer itself. The absorption coefficient is believed to be too low. However, when the light absorbing layer was composed of Cu (n·k value is 2.14; n=0.826, k=2.6), the reflectance of 5% or less was able to be observed.

In order to make the n·k value of the light absorbing layer at least two, it is preferable that the light absorbing layer is composed of a material selected from the group consisting of Cu, Cr, Mo, Fe, Ni, amorphous-Si, SiC, Ge, $WSi_2$, Ti, TiN, Ta, TiW, Co, SiGe, $TiSi_2$, $CrSi_2$, $MoSi_2$, $FeSi_2$, $CoSi_2$, $NiSi_2$, CrN and $Mo_2N$. The higher n·k value is more desirable, and it is more preferable that the light absorbing layer is composed of a material selected from Ni and Cr to raise the n·k value to at least five. When the light absorbing layer was composed of Ni (n·k value is 6; n=1.8, k=3.33), the reflectance of the light absorber was able to be not more than 3%. When the light absorbing layer was composed of Cr (n·k value is 14; n=3.18, k=4.41), the reflectance of the light absorber was able to be not more than 1%.

It is preferable in the light absorber that the light absorbing layer has a thickness that is sufficiently large for absorption of reflected light from the shading layer and is sufficiently small so as substantially to prevent reflection from the light absorber. It is preferable in the light absorber that the light absorbing layer has a thickness between 3 nm and 20 nm. The layer of a thickness of 3 nm or more can absorb the reflected light from the shading layer satisfactorily. Viewed in this light, the thickness is more preferably at least 4 nm. The layer of a thickness of 20 nm or less can control the reflection from the light absorbing layer well. Viewed in this light, the thickness is more preferably not more than 10 nm.

It is preferable in the light absorber that the transparent layer is composed of a material in which a refractive index is not more than 2.0. The lower refractive index (e.g. not more than 1.5) is more desirable for making the reflection from the light absorber attenuate more effectively. Viewed in this light, the transparent layer is preferably composed of a material selected from the group of $SiO_2$ and $MgF_2$ while the layer may be composed of other transparent materials like $Al_2O_3$, $TiO_2$, $Ta_2O_5$ and $ZrO_2$. With regard to a thickness of the transparent layer, the layer preferably has a thickness between 68 nm and 147 nm. The transparent layer adjusted appropriately as described above can utilize the interference of light in the multilayer to make the reflectance still lower.

It is preferable in the light absorber that the shading layer is composed of a material selected from the group consisting of Cu, Cr, Mo, Fe, Ni, amorphous-Si, SiC, Ge, $WSi_2$, Ti, TiN, Ta, TiW, Co, SiGe, $TiSi_2$, $CrSi_2$, $MoSi_2$, $FeSi_2$, $CoSi_2$, $NiSi_2$, CrN and $Mo_2N$. It is also preferable that the shading layer has a thickness of 40 nm or more. The layer of a thickness of 40 nm or more is desirable for shading the incident light substantially. The thickness of the shading layer is preferably not more than 200 nm in view of manufacturing efficiency.

It is preferable in the light absorber that the multilayer film further comprises a transparent layer as the closest layer to a source of the incident light, because the transparent layer can make the reflectance still lower. It is preferable that such a transparent layer is composed of a material in which a refractive index is not more than 2.0 (e.g. $SiO_2$, $MgF_2$) and has a thickness between 68 nm and 147 nm in the same way as the transparent layer formed between the shading layer and the light absorbing layer.

The light absorber of the present invention can attenuate the reflectance from itself to the extent of not more than 5% in a visible region. According to the preferred embodiments as described above, the reflectance can be not more than 3% or not more than 1%.

In order to utilize a low reflectance, the transparent layer and the light absorbing layer are located closer to an incident side of the incident light, being taking into account, than the shading layer. When the incident light entering from both sides of the light absorber is to be concerned, these layers should be located on both sides of the shading layer. The light absorber of the present invention can also attenuate the transmittance through itself to the extent of 1% or less in a visible region, even if the substrate is substantially transparent. Such an attenuation of the incident light is mainly caused by the absorption into the shading layer. The transmittance can be lowered to substantially 0%, if necessary. The light absorber of the present invention having such a low reflectance and a low transmittance can reduce unnecessary light in optical equipment enough to prevent the unnecessary light from affecting the performance of the equipment. The light absorber of the present invention is also useful in other regions such as an infrared region (e.g. between 0.7 μm and 12 μm).

In accordance with another aspect of the present invention, there is provided a light absorber comprising a substrate and a multilayer film formed on the substrate, the multilayer film being composed of at least two light absorbing layers and at least two transparent layers, the light absorbing layers and the transparent layers being laminated in turn so that incident light is substantially shaded by the light absorbing layers and reflection of the incident light is attenuated by absorption into at least one of the light absorbing layers formed closer to a source of the incident light than the light absorbing layer reflecting the incident light, wherein the closest light absorbing layer to a source of the incident light is composed of a material in which the product of a refractive index and an absorption coefficient is at least two and the light absorbing layer has a thickness between 3 nm and 20 nm.

In accordance with another aspect of the present invention, there is provided a light absorber comprising a substrate, a shading layer for shading incident light and a multilayer film formed closer to a source of the incident light than the shading layer, the multilayer film having a layered structure composed of (2n+1) layers including a transparent layer and a light absorbing layer in which the transparent layer and the light absorbing layer are laminated in turn and in the above order so that reflection of the incident light from the shading layer is attenuated by absorption into the light absorbing layer and interference of light in the layered structure, wherein n represents an integer of at least one, preferably represents between one and five, and more preferably represents one or two.

In accordance with another aspect of the present invention, there is provided an optical equipment including a light absorber comprising a substrate and a multilayer film formed on the substrate, wherein the multilayer film comprises a shading layer for shading incident light, a light absorbing layer formed closer to an incident side of the incident light than the shading layer, and a transparent layer formed between the shading layer and the light absorbing layer.

As examples of such optical equipment, there can be mentioned optical-disk equipment, a camera, video-movie camera, a microscope, an endoscope, a dental scope, optical communication equipment, a visual display and a laser printer. The light absorber of the present invention is useful for improving the performance of an optical device included in the optical equipment such as a light pickup device for optical-disk equipment, a dividing-color prism for a video-movie camera, an imaging sensor, a charge-coupled device (CCD), a color filter, an optical communication device and various kinds of lens.

It is preferable in the optical equipment that the optical equipment has an optical device in which light penetrates and/or reflects and unnecessary light included in the light to the optical device is attenuated by the light absorber. It is also preferable in the optical equipment that the light absorber and the optical device have a common substrate.

One of the preferred embodiments of the light absorber of the present invention includes a substrate, a shading layer formed on the substrate, and a multilayer including a transparent layer and a light absorbing layer formed on the shading layer. Another preferred embodiment of the light absorber, which also provides a low-reflective efficiency in incident light entering through a substrate, includes a substrate, a first multilayer including a transparent layer and a light absorbing layer formed on the substrate, a shading layer formed on the first multilayer, and a second multilayer including a transparent layer and a light absorbing layer formed on the shading layer.

More specific embodiments will be described with reference to the drawings. Referring to FIG. 1, the light absorber has a layered structure including a substrate 11, a first light absorbing layer 12 for shading incident light substantially (a shading layer), a first transparent layer 13 of a thickness between 68 nm and 148 nm, a second light absorbing layer 14 composed of a material in which the product of a refractive index and an absorption coefficient is at least two at a thickness between 3 nm and 20 nm (a partially shading layer), a second transparent layer 15 at a thickness between 68 nm and 148 nm. The shading layer 12 preferably has a thickness between 40 nm and 200 nm. The tranparent layers 13, 15 preferably have a refractive index of 2.0 or less, more preferably 1.5, and can be specifically composed of $SiO_2$ or $MgF_2$. As described above, the partially shading layer 14 is most preferably composed of Cr. Such a preferred structure was determined by some calculations based on the behavior of light (reflection, refraction, absorption) on a layer boundary between media having different refraction indices and some experiments.

When the shading layer 12 has a thickness of less than 40 nm, the shading effect of the light absorber tends to decline. When the partially absorbing layer 14 has a thickness of more than 20 nm, the reflectance of the light absorber tends to increase due to an increase of the reflectance of the partially absorbing layer 14 itself. When the partially absorbing layer 14 has a thickness of less than 3 nm, the reflectance of the light absorber tends to increase due to a decrease of the absorption into the layer 14 of the reflected light from the shading layer 12. When the transparent layers 13, 15 have a thickness of either less than 68 nm or more than 148 nm, the reflectance of the light absorber tends to increase. Such an increase is caused by a decrease in the multiplex interference of light in the layered structure.

Figure 6:
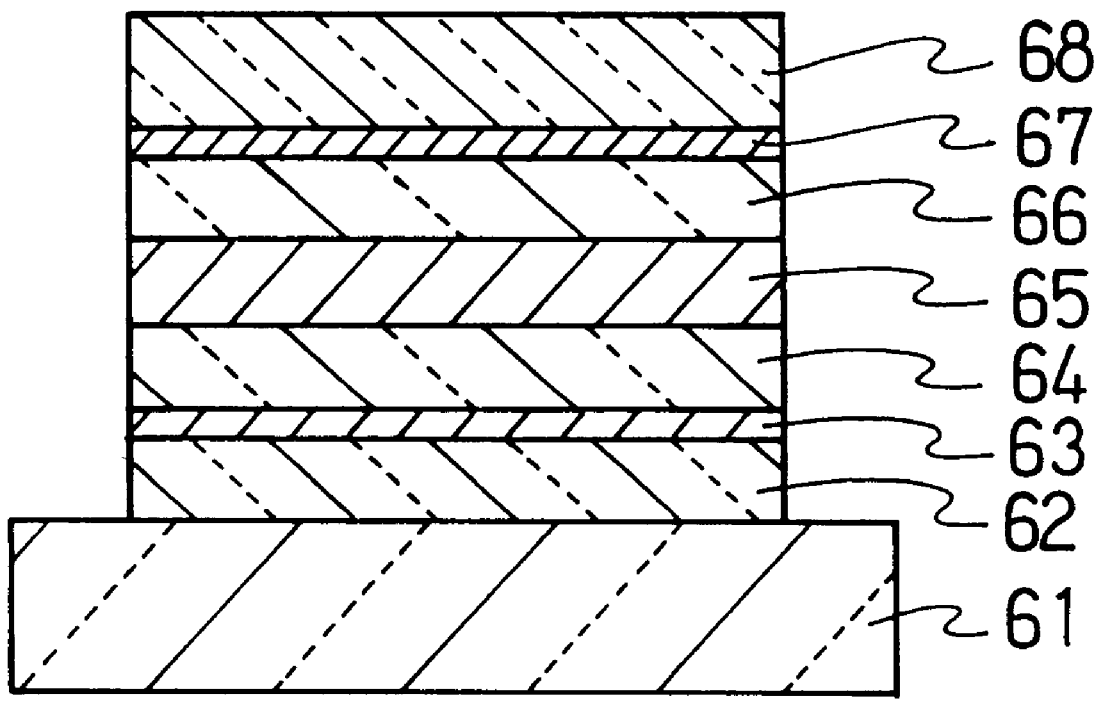
FIG. 6 is a cross sectional view showing another light absorber in accordance with the present invention.

Referring now to FIG. 6 where another specific embodiment is shown, the light absorber has a layered structure including a substrate 61, a first transparent layer 62 of a thickness between 68 nm and 148 nm, a first light absorbing layer 63 composed of a material in which the product of a refractive index and an absorption coefficient is at least two and having a thickness between 3 nm and 20 nm (a partially shading layer), a second transparent layer 64 of a thickness between 68 nm and 148 nm, a second light absorbing layer 65 for shading incident light substantially (a shading layer), a third transparent layer 66 of a thickness between 68 nm and 147 nm, a third light absorbing layer 67 composed of a material in which the product of a refractive index and an absorption coefficient is at least two and having a thickness between 3 nm and 20 nm (a partially shading layer) and a fourth transparent layer 68 of a thickness between 68 nm and 147 nm. In the same way as the layered structure as shown in FIG. 1, the shading layer 65 preferably has a thickness between 40 nm and 200 nm, composed of Cr and the like. Each of the transparent layers preferably has a refractive index of 2.0 or less, more preferably 1.5 or less, and can be composed of $SiO_2$ or $MgF_2$. The partially absorbing layers 63, 67 are most preferably composed of Cr. In the layered structure as shown in FIG. 6, incident light entering into the light absorber through the substrate 61 is also taken into account.

It is preferred in the light absorber as described above that the transparent layers have about the same thickness, because the correspondence between manufacturing conditions of these layers can make manufacturing management easier.

An antireflection layer can be further formed on the light absorber as an outermost layer. While known antireflection layers can be used, the layer is preferably composed of a compound selected from the group consisting of $Al_2O_3$, $TiO_2$, $MgF_2$ and $SiO_2$. The antireflection layer may constitute a multiple layer structure.

Each of the layers included in the light absorber can be formed by known methods such as a vapor deposition method, a chemical vapor deposition method and a sputtering method. The substrate can be composed of known materials such as glass, ceramics, metal and plastics.

Figure 11:
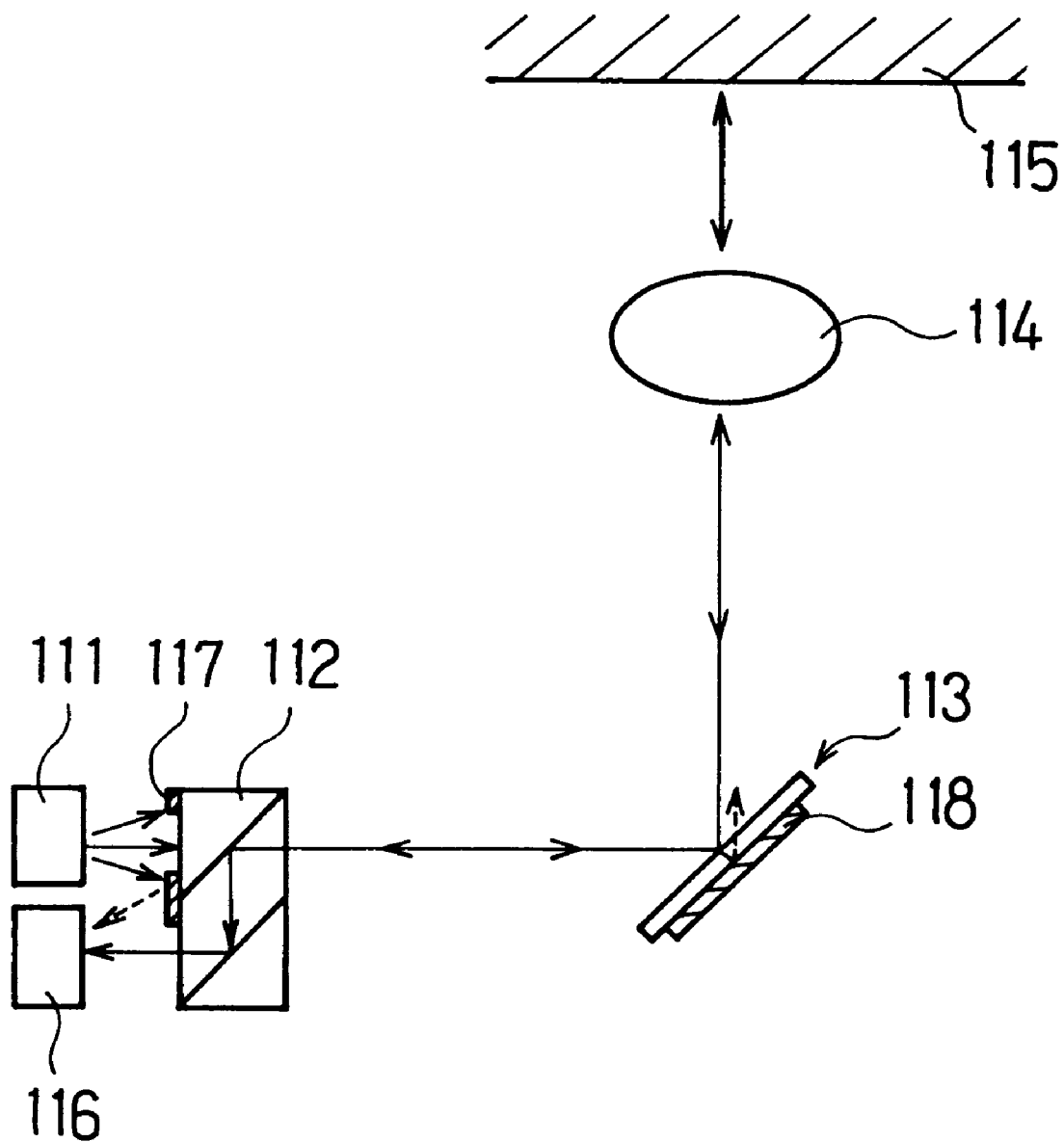
FIG. 11 is a schematic sectional view showing an optical path in an optical-disk device including a light absorber in accordance with the present invention.

In FIG. 11, an optical path in optical-disk equipment including the light absorber of the present invention is shown. An outgoing light beam from a semiconductor laser 111 passes through a beam splitter 112 before reflecting on a reflecting element 113, and passes thorough a lens 114 before condensing on an optical disk 115. The beam reflected on the disk 115 reaches a light detector 116 by way of the lens 114, the reflecting element 113 and the beam splitter 112.

The beam radiated by the laser 111 is partly reflected on the surface of the splitter 112 to reach the detector directly as shown in FIG. 11, because the beam has a tendency to advance with spreading to some extent. The signal detection in the optical-disk equipment is affected by such a reflected beam. The beam reaching the reflecting element 113 partly passes through its surface and reflects on the other surface to reach the detector in the end. Such a stray light also makes the signal to noise ratio (S/N ratio) of the signal detected by the detector 116 worse.

Known antireflection films formed on the surface of the splitter 112 and on the back surface of the reflecting element 113 cannot reduce noise light as described above so effectively that remaining light reflected on the films does not reach the detector 116. The light absorber of the present invention can eliminate the noise light enough to improve the efficiency of optical-disk equipment, when formed like a film 117 on the splitter 112 and a film 118 on the reflecting element 113.

Figure 12:
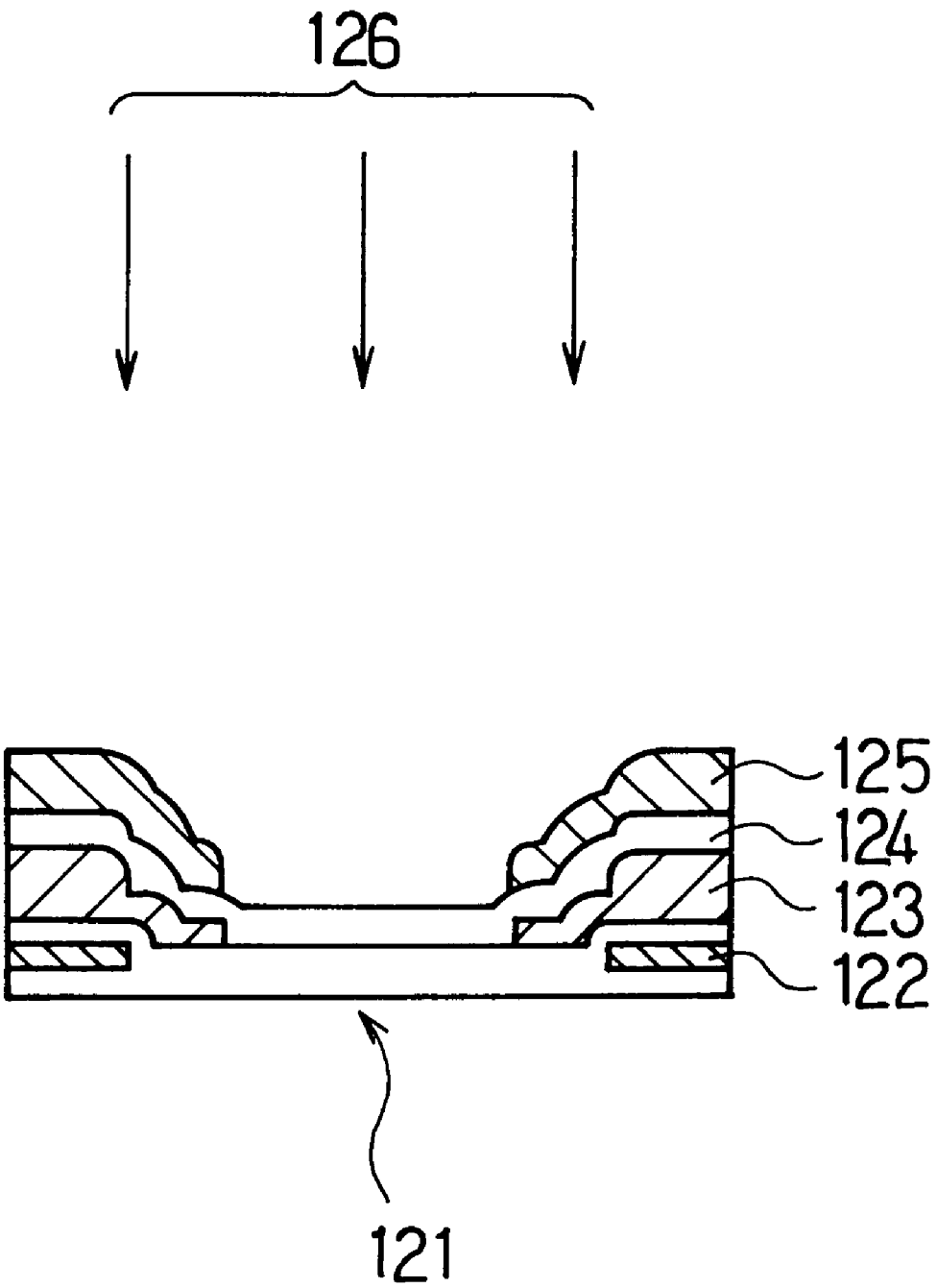
FIG. 12 is a cross sectional view of a charge-coupled device (CCD) including a light absorber in accordance with the present invention.

Referring now to FIG. 12, a charge-coupled device (CCD) includes a photodetector 121 for detecting picture information light 126, a polysilicon layer 122 for transmitting detected signals, a metal layer 123 for shielding the polysilicon layer 122 from the light 126, a protecting layer 124 for protecting the photodetector 124 and the layers 122, 123, and a light absorber 125 of the present invention.

Without the light absorber 125, the picture information light 126 partly reaches the metal layer 123 while most of the light 126 reaches the photodetector 121. Much of the light reaching the metal layer 123 is reflected on the layer 123 because the metal layer 123 is generally composed of a high reflective material like aluminum. The light reflected on the metal layer partly reaches other photodetectors as a stray light which influences the quality of a picture.

Such a noise can be reduced effectively by the light absorber 125 formed on the protecting layer 124 as the outermost layer. The light absorber may be formed in succession to other layers of the charge-coupled device by the same method for manufacturing efficiency.

Figure 13:
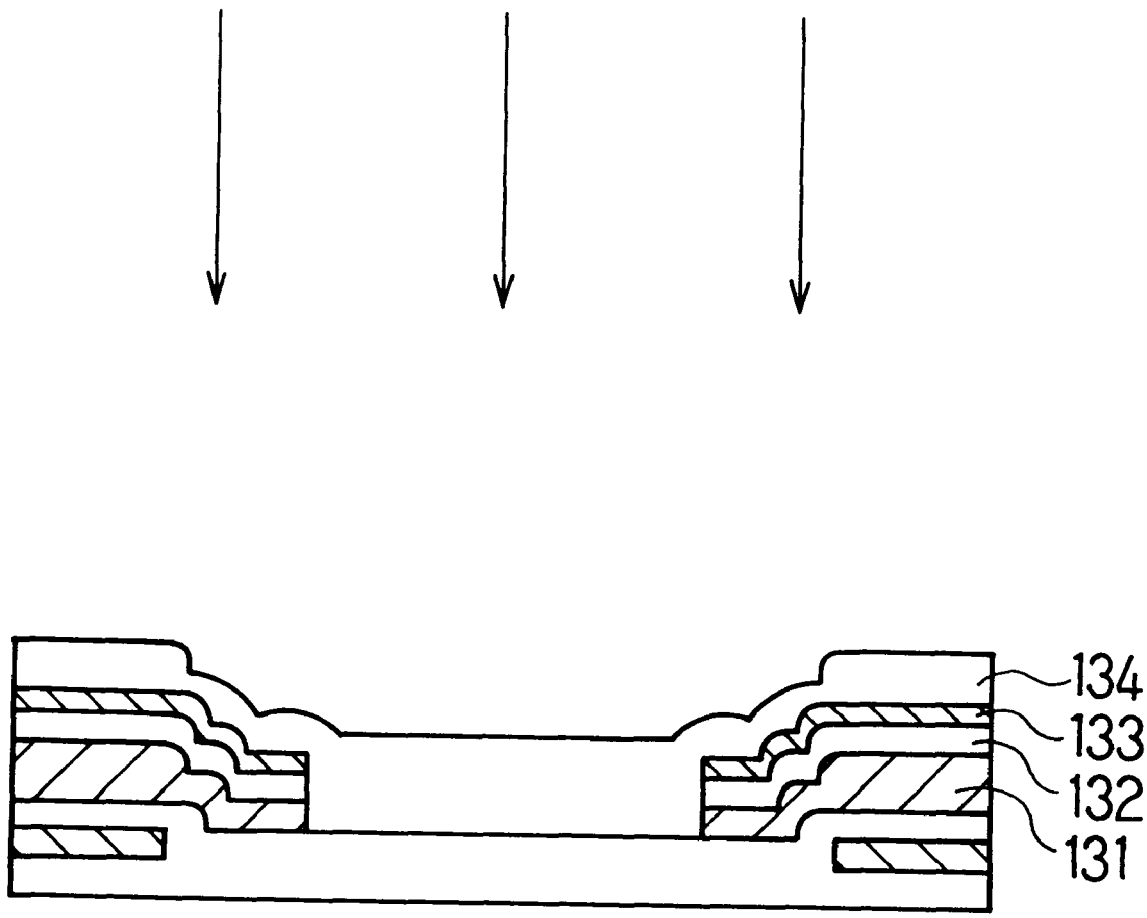
FIG. 13 is a cross sectional view of another charge-coupled device (CCD) including a light absorber in accordance with the present invention.

The light absorber of the present invention can take the place of the metal layer in FIG. 12 instead of being formed above the metal layer. In FIG. 13, the metal layer was replaced by a multilayer working as a light absorber, composed of a shading layer 131, a transparent layer 132, a light absorbing layer 133 and a transparent layer 134. In such a case, the transparent layer 134 can be used a protecting layer for a photodetector. The multilayer can shield a polysilicon layer from the information light by absorbing most of the light. The light absorbing layer 133 as shown in FIG. 13 is preferably composed of silicide or nitride of Mo, Ti, Ta and the like. For example, such a material can be formed by a sputtering. The transparent layers 132, 134 can be composed of SiON or SiN as well as the materials as described above. For example, such a material can be formed by a chemical vapor deposition method.

Figure 14:
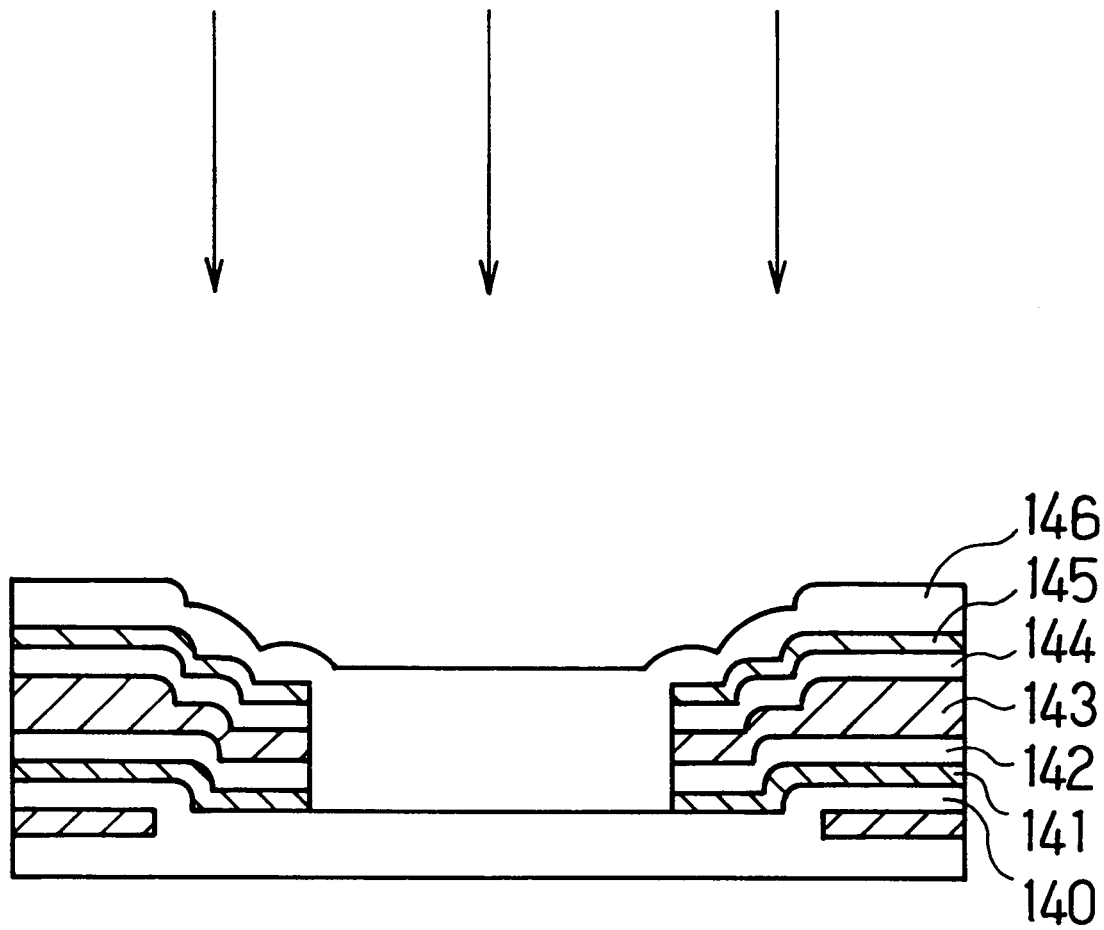
FIG. 14 is a cross sectional view of another charge-coupled device (CCD) including a light absorber in accordance with the present invention.

As shown in FIG. 14, the metal layer 123 can be replaced by a multilayer, composed of a transparent layer 140, a light absorbing layer 141, a transparent layer 142, a shading layer 143, a transparent layer 144, a light absorbing layer 145 and a transparent layer 146. According to such a multilayer, the light entering from both sides of the multilayer can be absorbed effectively so that the optical performance of the charge-coupled device is improved further. For example, the light transmitted in the transparent layer 140 enters through the underside surface of the light absorber to be absorbed.

Figure 15:
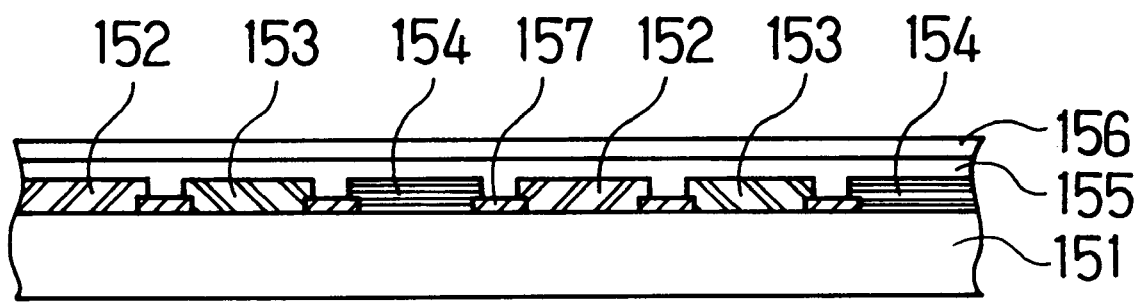
FIG. 15 is a cross sectional view of a color-filter element for a display including a light absorber in accordance with the present invention.
Figure 16:
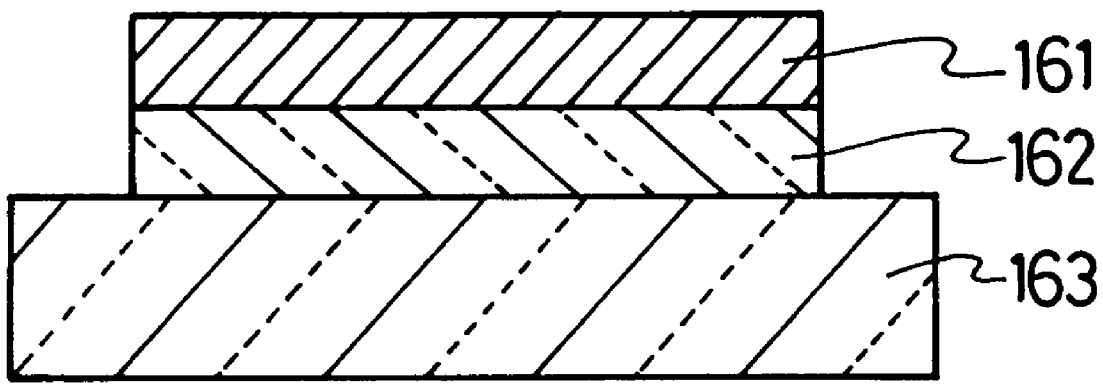
FIG. 16 is a cross sectional view showing a known light absorber.

Referring now to FIG. 15, a color-filter element for a display such as a liquid crystal display includes a substrate 151, and a color filter with red, green and blue filters 152–154, a protecting layer 155 and a transparent electrode 156. A light absorber of the present invention 157 is formed between the filters 152–154 to absorb the light which will not pass through the filters 152–154. The light absorber also works to reduce reflection of external light from an interior lamp and the like to prevent the contrast of an image from deteriorating. The light absorber of the present invention is useful for other kinds of displays in improving the quality of an image as well as a liquid crystal display as described above.

EXAMPLES

Example 1

A light absorber having the same structure as shown in FIG. 1 was produced, which includes a glass plate of BSC-7 (trade name) made by HOYA corporation, a kind of optical glass, as a substrate 11, chromium layers as a shading layer 12 and a light absorbing layer 14, and a silicon dioxide layer as transparent layers 13, 15. The chromium layers and the silicon dioxide layers were formed by an electron beam vapor deposition method. The materials and the thickness (optical thickness) of the layers are shown in Table 1.

TABLE 1

|  | Material | Optical thickness (nm) |
|---|---|---|
| Entrance medium | air | — |
| Fourth layer | SiO$_2$ | 113 |
| Third layer | Cr | 5 |
| Second layer | SiO$_2$ | 113 |
| First layer | Cr | 40 |
| Substrate | optical glass (BSC 7) | — |

A chromium layer 12 as a first layer serves to attenuate incident light from the upper side of the light absorber, and its thickness of 40 nm is enough to shade the incident light substantially. (the incident light reaching the substrate 11 can be lowered to nearly zero.) A chromium layer 14 as a third layer serves to prevent the light reflected on the chromium layer 12 from advancing to the outside of the light absorber, and its thickness of 5 nm is enough to absorb the reflected light effectively without reflecting the incident light on itself so much. Silicon dioxide layers 13, 15 as a second layer between chromium layers and as a fourth layer of the outermost layer are substantially transparent, and their thickness of 113 nm is suitable for causing multiplex interference of light including the incident light and its reflected light from the boundary of the layers to make the reflectance still lower. The silicon dioxide layers 13, 15 have the same thickness to simplify the process for producing the light absorber.

Figure 2:
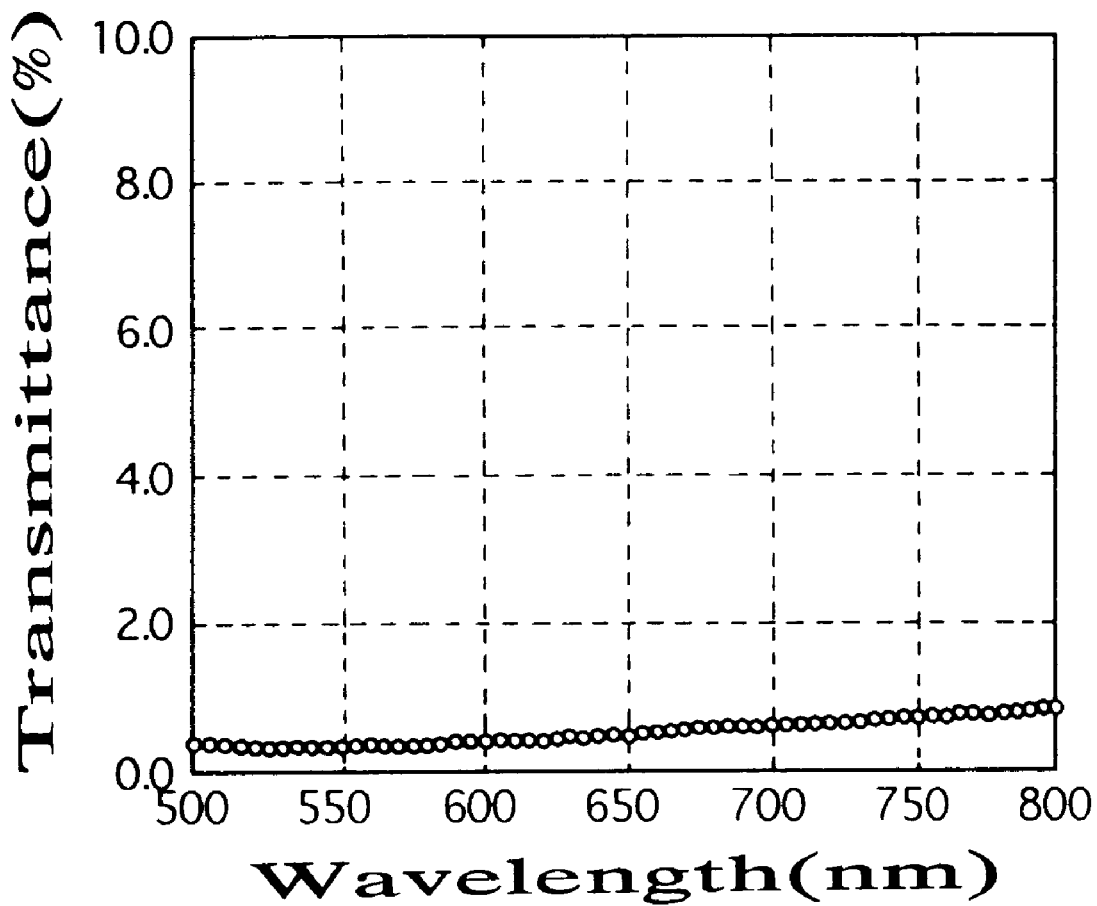
FIG. 2 is a graph showing a transmittance with respect to wavelength of incident light into a light absorber as shown in FIG. 1.
Figure 3:
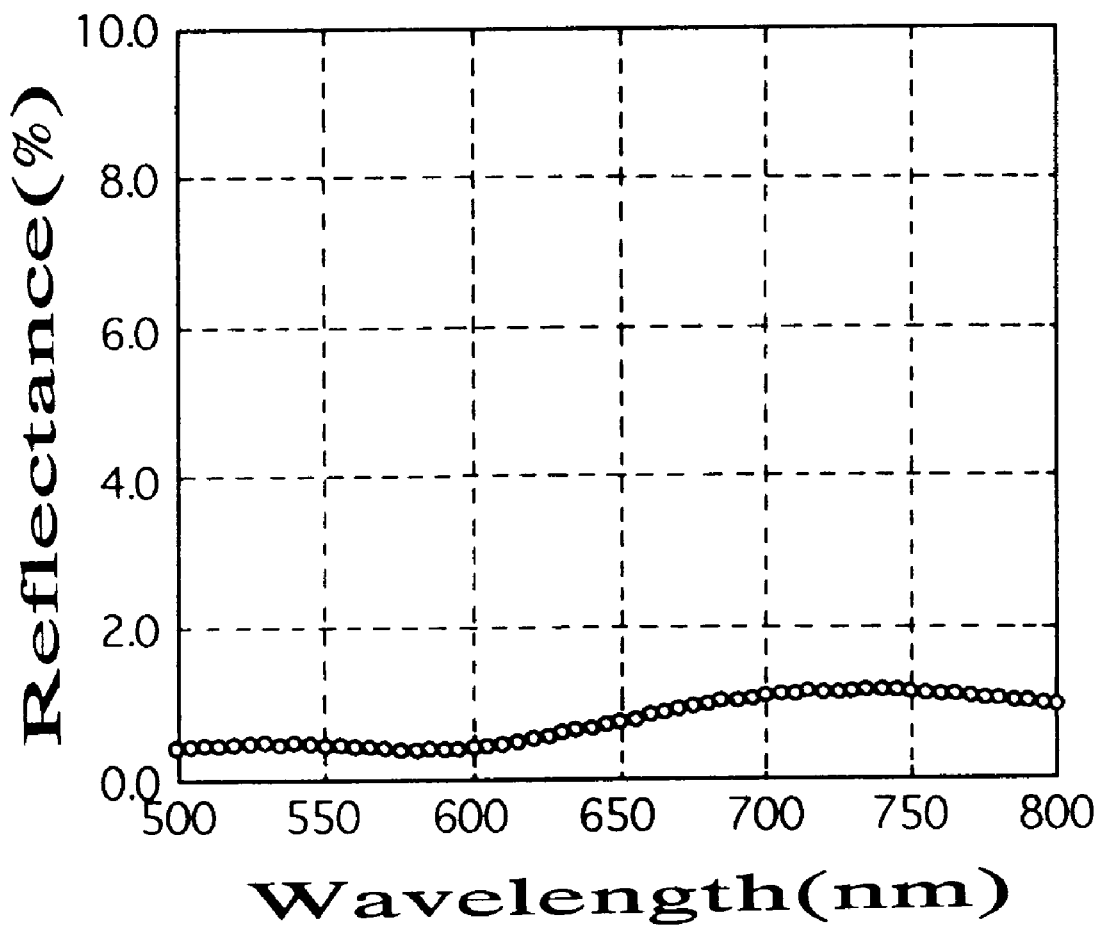
FIG. 3 is a graph showing a reflectance with respect to wavelength of incident light into a light absorber as shown in FIG. 1.

FIGS. 2 and 3 show the transmittance and the reflectance (both are measured in a visible region) with respect to wavelength of the incident light into the transparent layer 15 of the above light absorber with an incident angle of 0°. As shown in FIGS. 2 and 3, the transmittance and the reflectance are not more than 1%.

Figure 4:
FIG. 4 is a graph showing a transmittance with respect to an angle of incidence of incident light into a light absorber as shown in FIG. 1.
Figure 5:
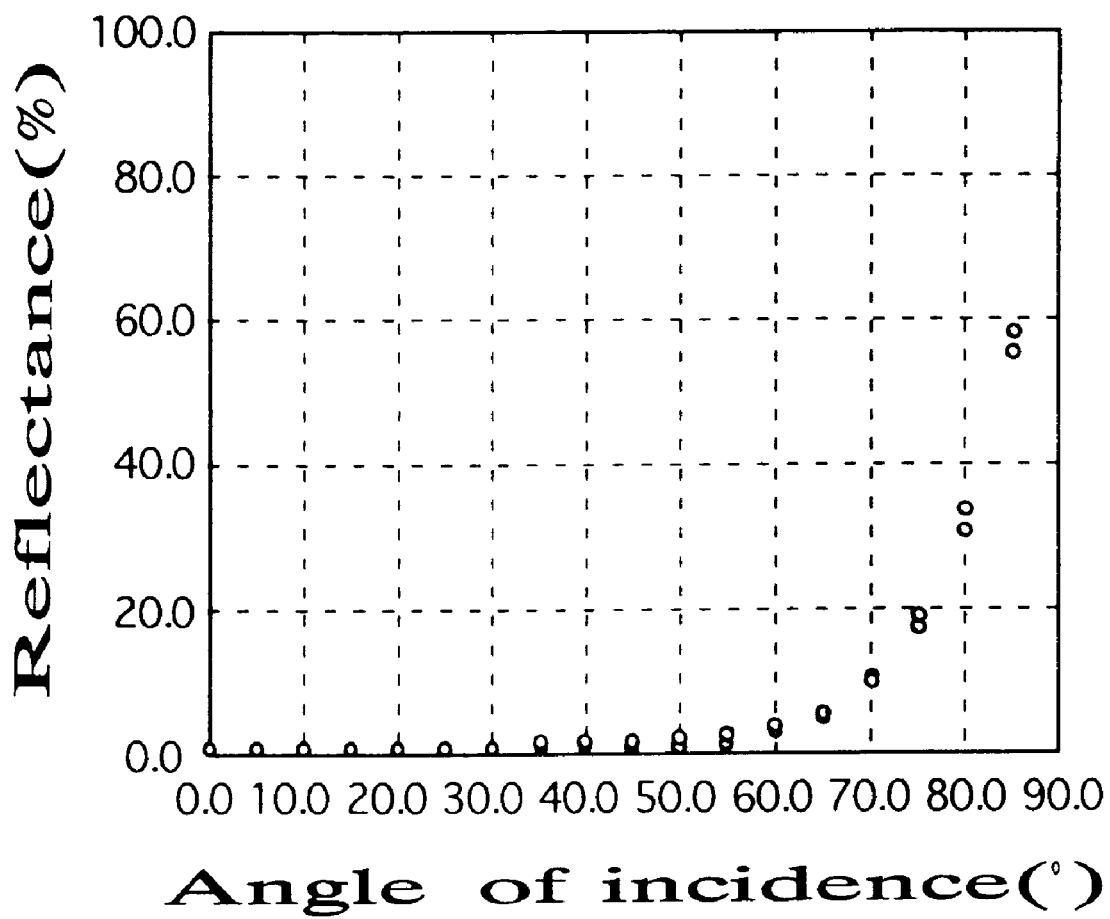
FIG. 5 is a graph showing a reflectance with respect to an angle of incidence of incident light into a light absorber as shown in FIG. 1.

FIGS. 4 and 5 show the transmittance and the reflectance (both are measured in a visible region) with respect to an incident angle of the light entering into the transparent layer 15. As shown in FIGS. 4 and 5, the light absorber has good optical characteristics to absorb rays of light reached from various angles. An effective range of the incident angle is not limited narrowly, but the reflectance of 5% or less is observed in the wide range of about 0°–60° in FIG. 5. Thus the light absorber is believed to be very useful for various kinds of optical devices in which unnecessary light needs to be controlled.

When the thickness of the chromium layer 12 only increased, (that is, the thicknesses of other layers were fixed,) light absorbers showed about the same properties as described above. However, when the thickness of the chromium layer 12 decreased to less than 40 nm, the transmittance tended to rise. This investigation shows that a chromium layer 12 as a first layer preferably has a thickness of 40 nm or more. Taking manufacturing cost and efficiency into consideration, the thickness is more preferably between 40 nm and 200 nm.

When the thickness of the chromium layer 14 as a third layer only changed in a range between 4 nm and 10 nm, (that is, the thicknesses of other layers were fixed,) light absorbers showed about the same optical properties as described above. However, when the thickness of the chromium layer 12 increased to more than 10 nm, the reflectance tended to rise due to the increase of the reflection by the layer 12. When the thickness decreased to less than 4 nm, the reflectance tended to rise due to the decrease of the absorption of the reflected light from the layer 12. This investigation shows that a chromium layer 14 as a third layer preferably has a thickness between 4 nm and 10 nm.

When the thickness of the silicon dioxide layers 13, 15 only changed in the range between 68 nm and 147 nm, (that is, the thickness of other layers were fixed,) light absorbers showed about the same optical properties as described above. However, when the thickness of the silicon dioxide layers 13, 15 increased to more than 147 nm or when the thickness decreased to less than 68 nm, the reflectance tended to rise due to the decrease of the multiplex interference.

Light absorbers having magnesium fluoride layers substituted for the silicon dioxide layers 13, 15 showed about the same optical properties. Investigating about some other transparent dielectric materials such as aluminum oxide, light absorbers including the transparent layers made of the other materials did not show better optical properties than that including silicon dioxide or magnesium fluoride, but were better than known light absorbers.

Example 2

A light absorber having the same structure as shown in FIG. 6 was produced, including a glass plate of BSC-7 (trade name) made by HOYA corporation, a kind of optical glass, as a substrate 61, chromium layers as a shading layer 65 and a light absorbing layer 63, 67, and silicon dioxide layers as transparent layers 62, 64, 66, 68. The chromium layers and the silicon dioxide layers were formed by an electron beam vapor deposition method.

While the light absorber as described in Example 1 is able to shade the light originating from the film-formed side with an anti-reflecting effect, the light absorber as described in this example is able to shade the light originating from the substrate side (the under side in FIG. 6) with an anti-reflecting effect as well as the light from the film-formed side. The materials and the thickness (optical thickness) of the layers are shown in Table 2.

TABLE 2

| | Material | Optical thickness (nm) |
|---|---|---|
| Entrance medium | air | — |
| Seventh layer | SiO$_2$ | 113 |
| Sixth layer | Cr | 5 |
| fifth layer | SiO$_2$ | 113 |
| Fourth layer | Cr | 40 |
| Third layer | SiO$_2$ | 113 |
| Second layer | Cr | 5 |
| First layer | SiO$_2$ | 113 |
| Substrate | optical glass (BSC 7) | — |

In the light absorber, a portion of the film 62–68 composed of a chromium layer 65, a silicon dioxide layer 66, a chromium layer 67 and a silicon dioxide layer 68 constitutes the same structure as the layers 12–15 in Example 1, and another portion of the film 62–68 composed of a chromium layer 65, a silicon dioxide layer 64, a chromium layer 63 and a silicon dioxide layer 62 also constitutes the same structure for absorbing the light entering through the substrate 61.

Figure 7:
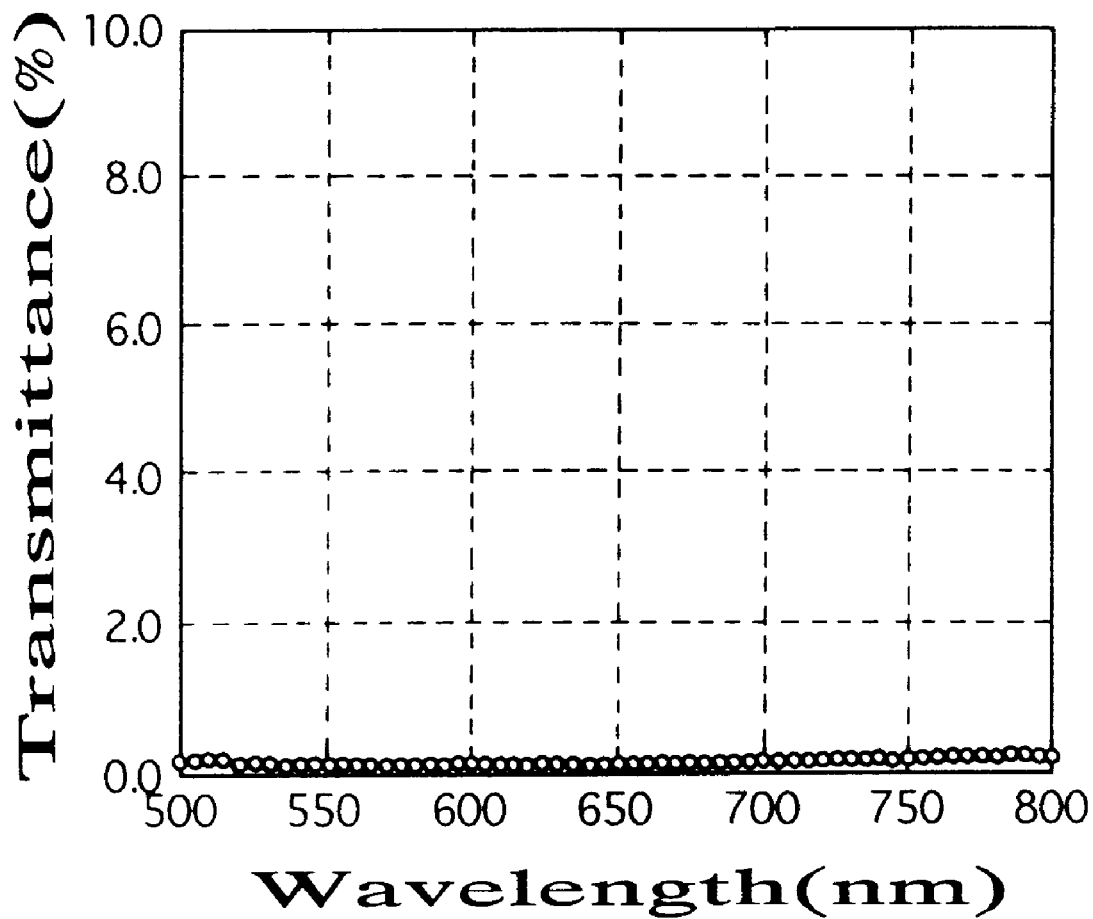
FIG. 7 is a graph showing a transmittance with respect to wavelength of incident light from the upper side of a light absorber as shown in FIG. 6
Figure 8:
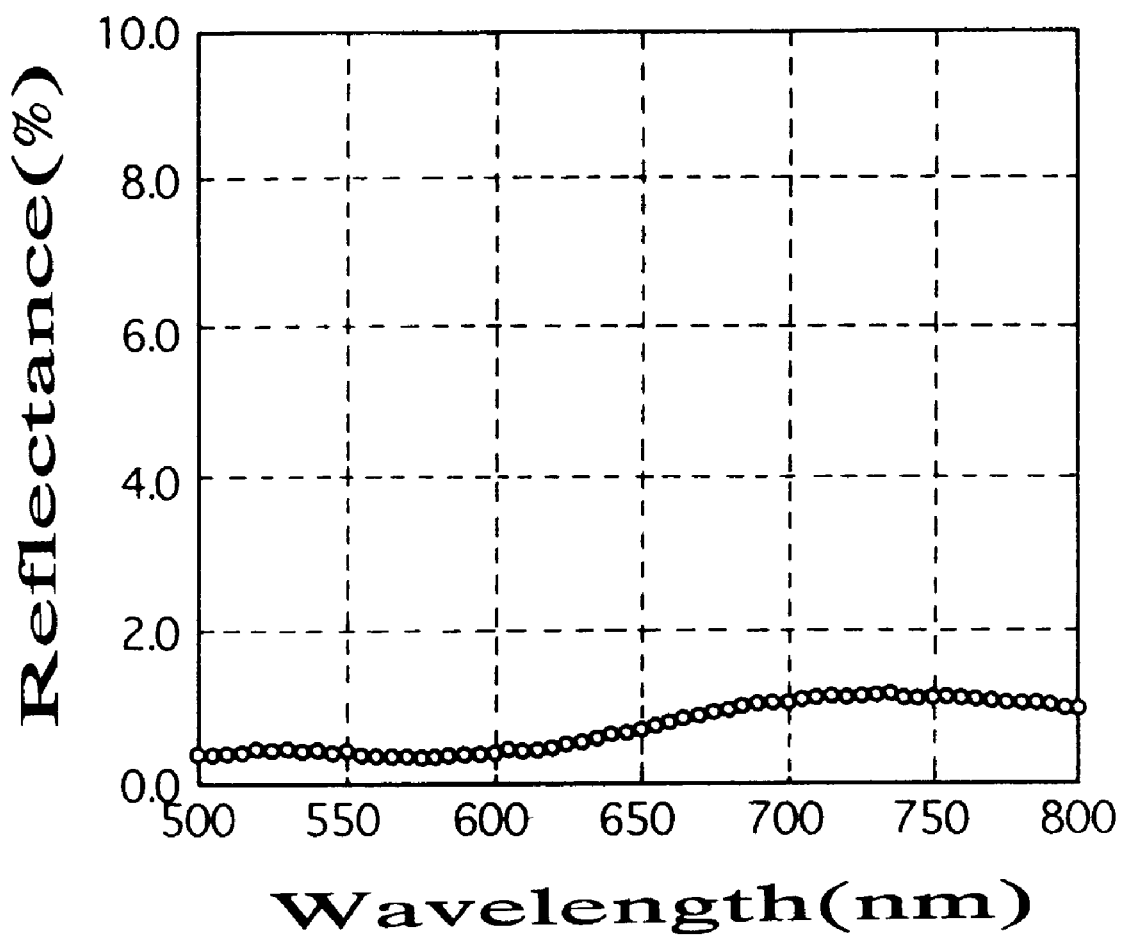
FIG. 8 is a graph showing a reflectance with respect to wavelength of incident light from the upper side of a light absorber as shown in FIG. 6

FIGS. 7 and 8 show the transmittance and the reflectance (both are measured in a visible region) with respect to wavelength of the incident light from the upper side in FIG. 6 into the silicon dioxide layer 68 of the above light absorber with an incident angle of 0°. As shown in FIGS. 7 and 8, the transmittance and the reflectance are not more than 1%.

Figure 9:
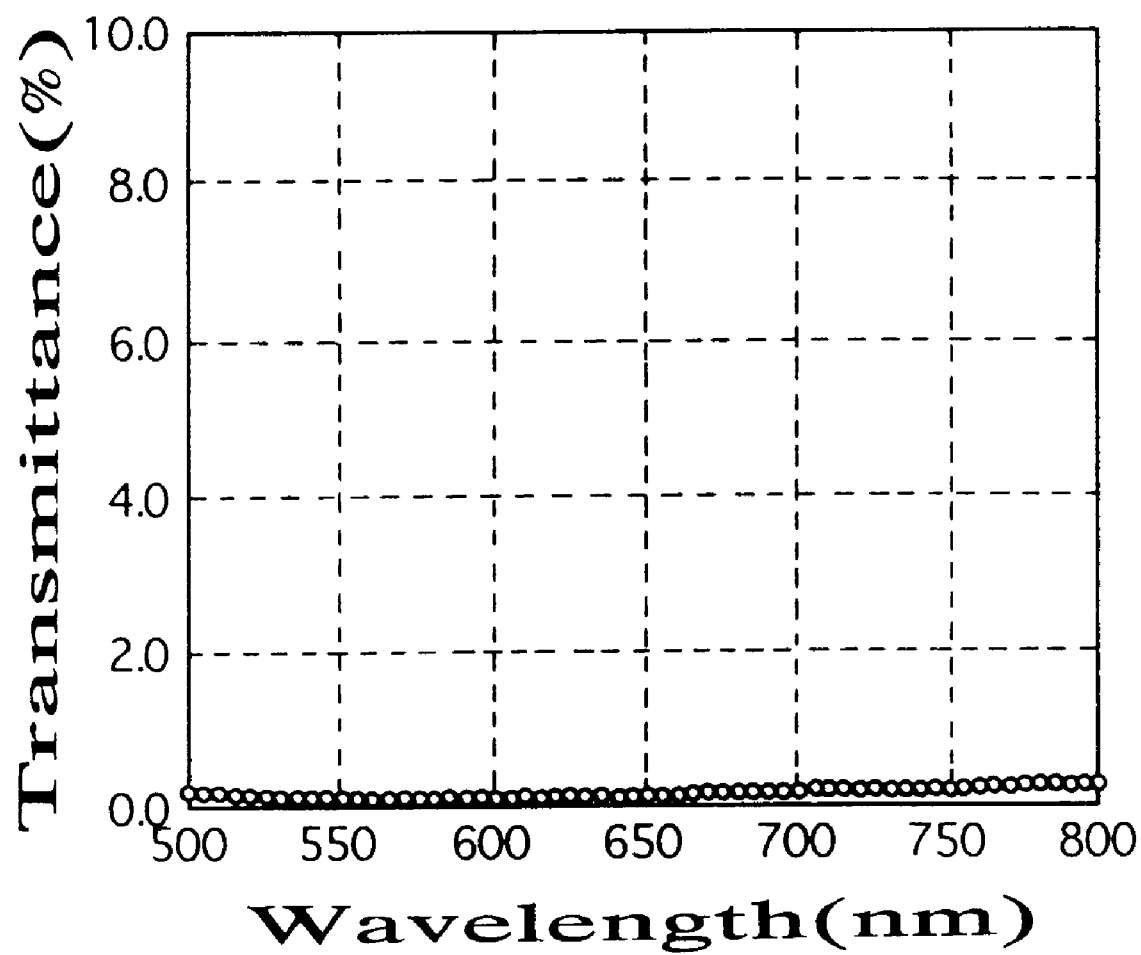
FIG. 9 is a graph showing a transmittance with respect to wavelength of incident light from the underside of a light absorber as shown in FIG. 6.
Figure 10:
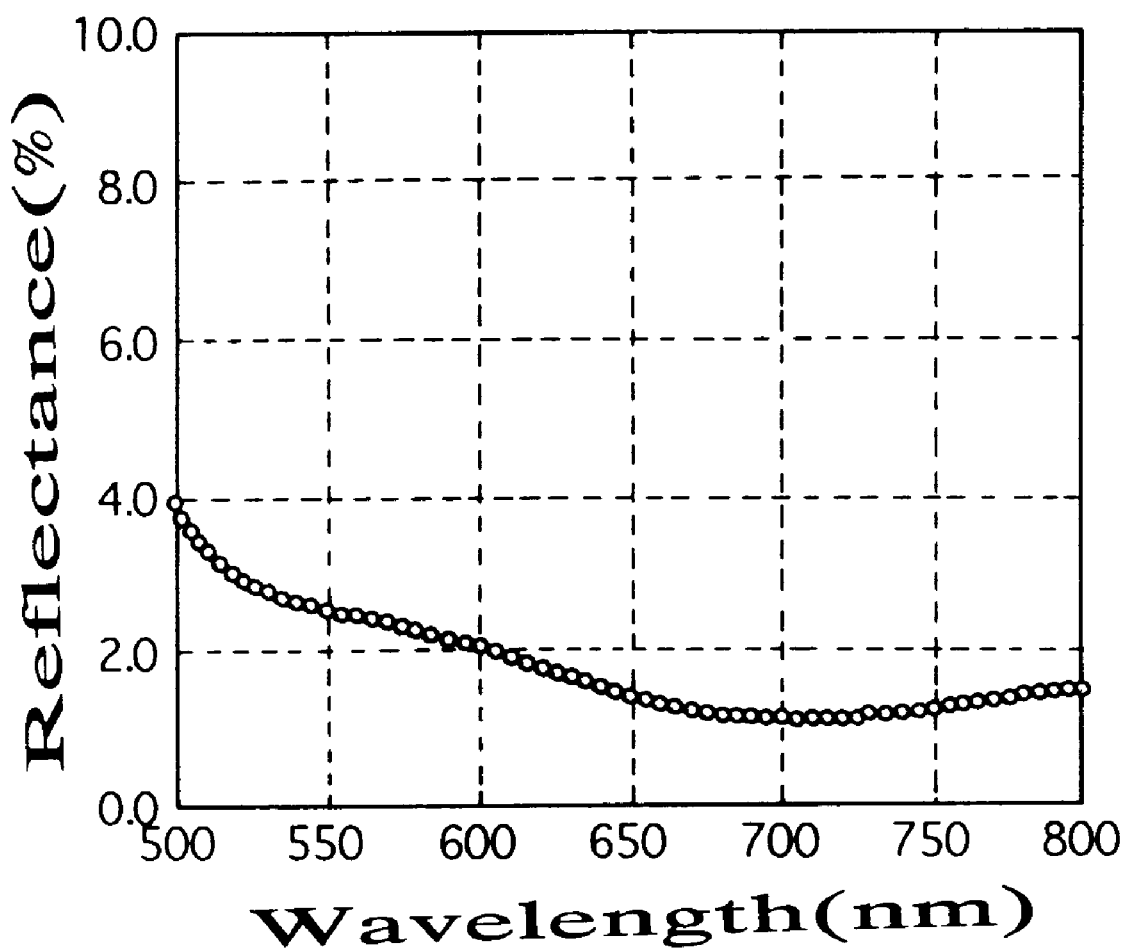
FIG. 10 is a graph showing a reflectance with respect to wavelength of incident light from the underside of a light absorber as shown in FIG. 6

FIGS. 9 and 10 show the transmittance and the reflectance with respect to wavelength of the incident light from the underside in FIG. 6 into the substrate 61 of the above light absorber with an incident angle of 0°. As shown in FIGS. 9 and 10, the light absorber as shown in FIG. 6 is effective for the light entering through the substrate in spite of no films being on the under surface of the substrate.

Investigation on the effect of changing the thickness of the layers showed the same results as described in Example 1.

The invention may be embodied in other forms without departing from the spirit or essential characteristics thereof. The embodiments disclosed in this application are to be considered in all respects as illustrative and not restrictive. The scope of the invention is indicated by the appended claims rather than the foregoing description, and all changes that come within the meaning and range of equivalency of the claims are intended to be embraced therein.

We claim:

1. A light absorber comprising a substrate and a multilayer film formed on the substrate, wherein the multilayer film comprises:

a shading layer for shading incident light, a light absorbing layer formed between an incident side of the incident light and the shading layer, and a transparent layer formed between the shading layer and the light absorbing layer, wherein the light absorbing layer is composed of a material in which the product of a refractive index and an absorption coefficient is at least two, wherein a transmittance of the incident light across the visible range by the light absorber is less than about 1%.

2. A light absorber according to claim 1, wherein the light absorbing layer is composed of a material selected from the group consisting of Cu, Cr, Mo, Fe, Ni, amorphous-Si, SiC, Ge, WSi$_2$, Ti and TiN.

3. A light absorber according to claim 1, wherein the light absorbing layer has a thickness that is sufficiently large for absorption of reflected light from the shading layer and is sufficiently small so as substantially to prevent reflection from the light absorber.

4. A light absorber according to claim 1, wherein the light absorbing layer has a thickness between 3 nm and 20 nm.

5. A light absorber according to claim 1, wherein the transparent layer is composed of a material in which a refractive index is not more than 2.0.

6. A light absorber according to claim 5, wherein the transparent layer is composed of a material selected from the group consisting of SiO$_2$ and MgF$_2$.

7. A light absorber according to claim 1, wherein the transparent layer has a thickness between 68 nm and 147 nm.

8. A light absorber according to claim 1, wherein transmitted light in the multilayer film and reflected light from boundaries of the layers in the multilayer film interfere with one another to attenuate reflection of the incident light.

9. A light absorber according to claim 1, wherein the shading layer is composed of a material selected from the group consisting of Cu, Cr, Mo, Fe, Ni, amorphous-Si, SiC, Ge, WSi$_2$, Ti, TiN, Ta, TiW, Co, SiGe, TiSi$_2$, CrSi$_2$, MoSi$_2$, FeSi$_2$, CoSi$_2$, NiSi$_2$, CrN and Mo$_2$N.

10. A light absorber according to claim 1, wherein the shading layer has a thickness of at least 40 nm.

11. A light absorber according to claim 1, wherein the multilayer film further comprises a transparent layer as the closest layer to a source of the incident light.

12. A light absorber according to claim 1, wherein a reflectance of the incident light is not more than 5%.

13. A light absorber comprising a substrate and a multilayer film formed on the substrate, the multilayer film being composed of at least two light absorbing layers and at least two transparent layers, the absorbing layers and the transparent layers being laminated in turn so that incident light is substantially shaded by the light absorbing layers and reflection of the incident light is attenuated by absorption into at least one of the light absorbing layers formed closer to a source of the incident light than the light absorbing layer reflecting the incident light, wherein the closest light absorbing layer to a source of the incident light is composed of a material in which the product of a refractive index and an absorption coefficient is at least two and has a thickness between 3 nm and 20 nm, wherein a transmittance of the incident light across the visible range by the light absorber is less than about 1%.

14. A light absorber comprising a substrate, a shading layer for shading incident light substantially formed on the substrate, a first transparent layer at a thickness between 68 nm and 147 nm formed on the shading layer, a light absorbing layer composed of a material in which the product of a refraction index and an absorption coefficient is at least two having a thickness between 3 nm and 20 nm formed on the first transparent layer and a second transparent layer at a thickness between 68 nm and 147 nm formed on the light absorbing layers, wherein a transmittance of the incident light across the visible range by the light absorber is less than about 1%.

15. An optical equipment including a light absorber comprising a substrate and a multilayer film formed on the substrate, wherein the multilayer film comprises:

a shading layer for shading incident light, a light absorbing layer formed between an incident side of the incident light and the shading layer, and a transparent layer formed between the shading layer and the light absorbing layer, wherein the light absorbing layer is composed of a material in which the product of a refractive index and an absorption coefficient is at least two, wherein a transmittance of the incident light across the visible range by the light absorber is less than about 1%.

16. An optical equipment according to claim 15, the optical equipment having an optical device in which light penetrates, wherein light having an undesired effect on the optical equipment is attenuated by the light absorber.

17. An optical equipment according to claim 16, wherein the light absorber and the optical device have a common substrate.

18. An optical equipment according to claim 15, the optical equipment having an optical device in which light is reflected, wherein light having an undesired effect on the optical equipment is attenuated by the light absorber.

19. An optical equipment according to claim 18, wherein the light absorber and the optical device have a common substrate.

* * * * *